UNITED STATES PATENT OFFICE.

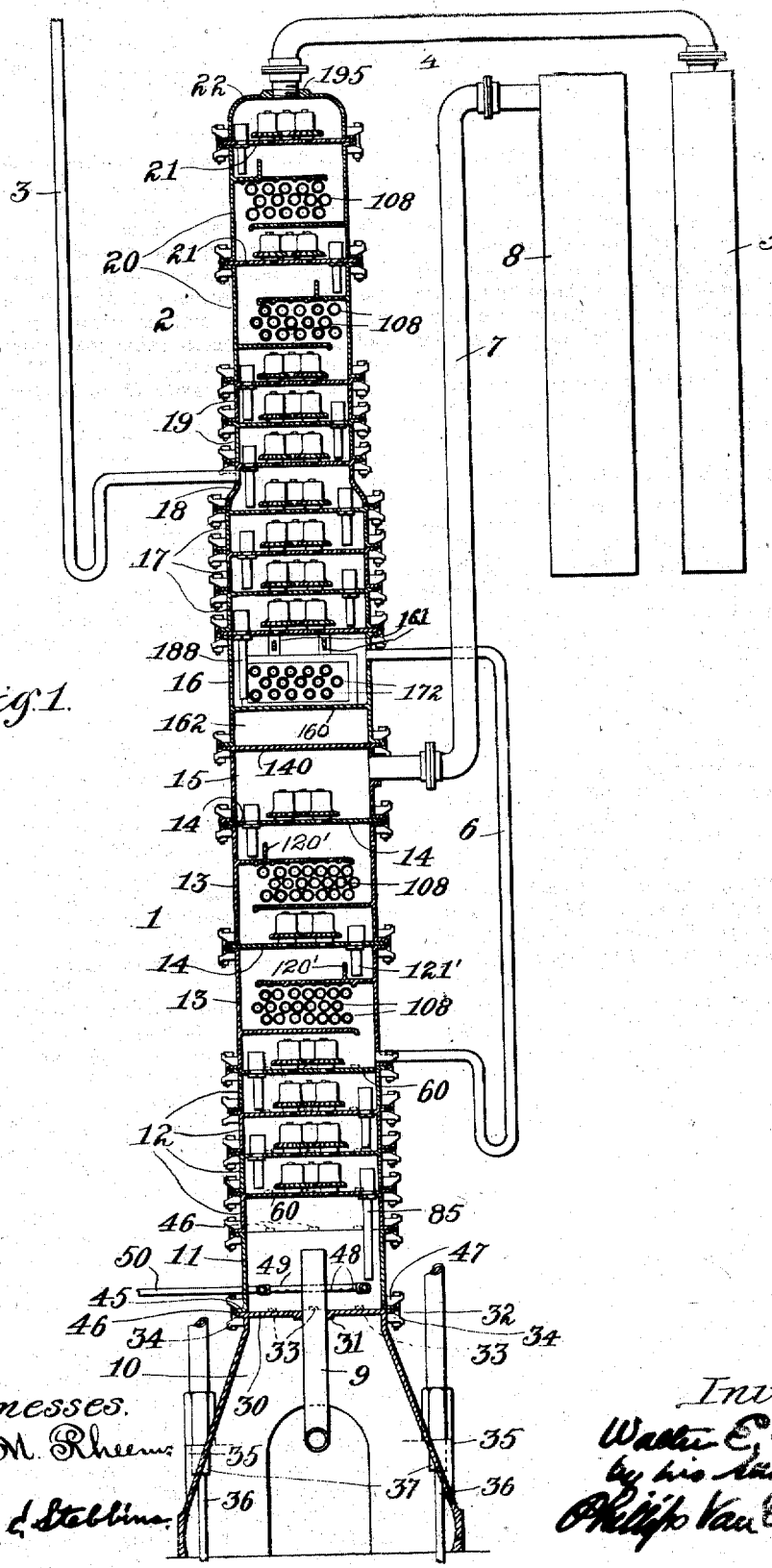

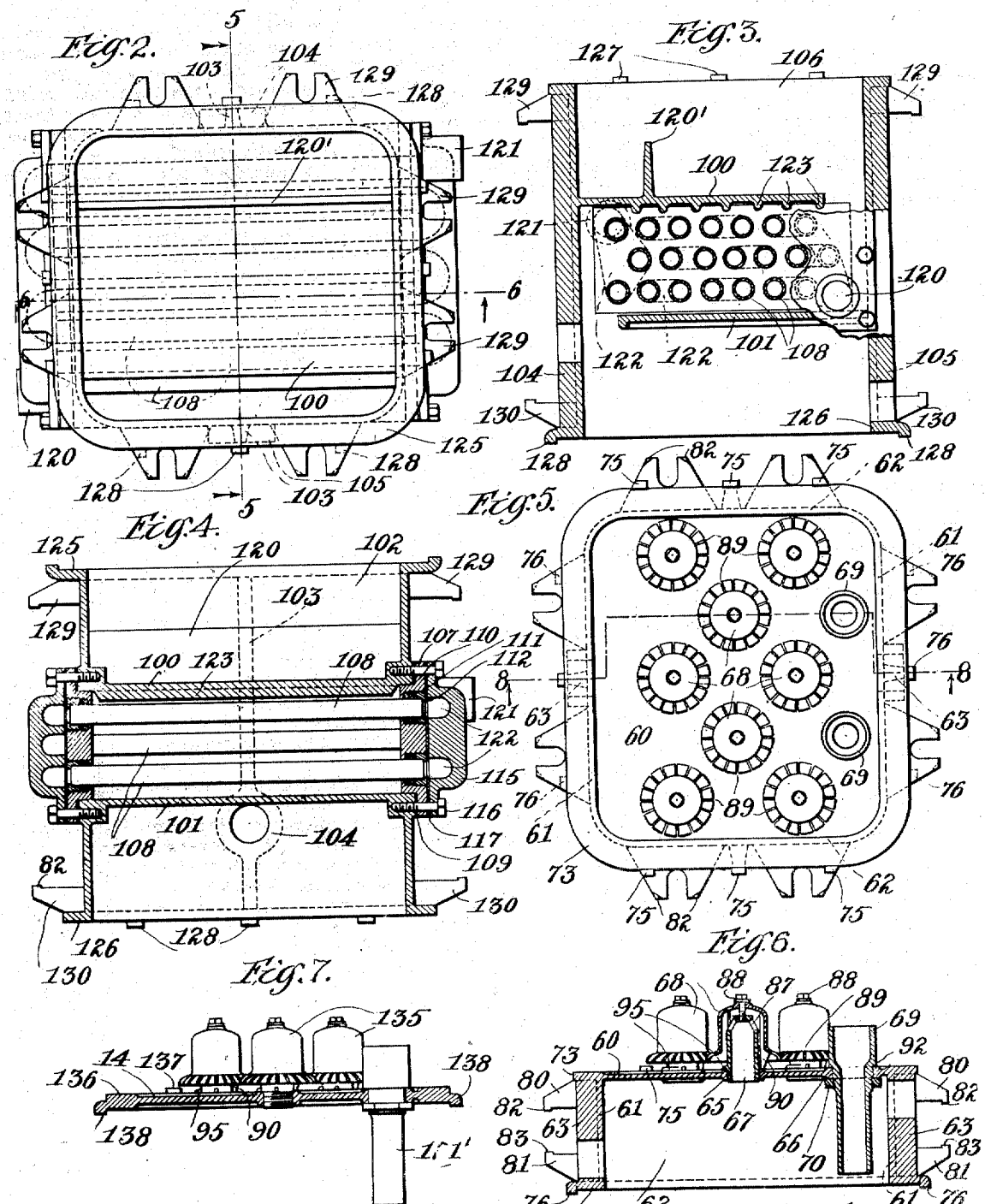

WALTER E. LUMMUS, OF LYNN, MASSACHUSETTS.

COLUMN FOR DISTILLATION AND THE LIKE.

1,226,898.  Specification of Letters Patent.  Patented May 22, 1917.

Application filed August 19, 1911. Serial No. 644,927.

*To all whom it may concern:*

Be it known that I, WALTER E. LUMMUS, a citizen of the United States, residing at Lynn, in the county of Essex and State of Massachusetts, have invented certain new and useful Improvements in Columns for Distillation and the like; and I do hereby declare the following to be a full, clear, and exact description of the invention, such as will enable others skilled in the art to which it appertains to make and use the same.

The present invention relates to columns or towers used for distillation, for gas washing, for absorbing gases in liquid and for like processes.

The concentration of alcohol and other volatile liquids from dilute solutions or liquid mixtures is usually conducted in stills provided with distilling or rectifying columns in which the vapor is caused to undergo a series of distillations and from which only the more volatile liquids survive as vapor to be liquefied in the condenser and from which the less volatile liquids are drained off at the bottom.

In such distilling columns a stream of vapor is caused to ascend through the column and is brought into intimate contact with and is washed by a descending stream of liquid, in which washing operation the less volatile part of the vapor is liquefied and the more volatile part of the liquid is vaporized. As a result of these multiple washings, or distillations, the vapor which is collected at the top of a column is composed of the more volatile constituents, in nearly a pure state, of the mixture which was led into the tower, and the less volatile part of the mixture is drained in liquid form from the bottom of the column.

In the treatment of gases to remove some of the impurities, washing columns or towers are employed through which the gas is caused to ascend and is washed by a stream of liquid flowing downwardly through the column. The liquid washes out the impurities and the purified gas is collected at the top of the column.

In making liquid solutions of gases, similar columns or towers are often employed. The liquid in which the gas is to be absorbed is admitted to the top of the column, flows downwardly in intimate contact with the stream, the gas ascending through the column, and is collected at the bottom as a liquid solution of the gas.

The columns or towers for the above mentioned purposes have been constructed in a variety of ways, but the usual construction and the one with which the present invention is particularly concerned is to form the column of a number of communicating chambers placed in series, one above the other. To cope in the most efficient manner with the different conditions under which such columns are employed, the number of chambers, and particularly in distilling columns, the type of the several chambers must be varied to meet each individual case.

One object of the present invention is to improve the construction of such columns or towers by making interchangeable units or sections and combining the units or sections into a complete column or tower. The individual units are so constructed that any unit may be fitted to any other unit, so that each unit can be constructed entirely separate from and independently of the other units, and then a desired number of units of one or more of the different types of units may be selected and combined to form a column having the units arranged in any combination most advantageous for the particular conditions at hand. In some columns, like gas washing columns, which are composed of a series of similar washing chambers, one of the advantages obtained by the present invention lies in the ability to select and combine the exact number of units or sections needed, while in other columns, like in distilling columns, which are composed of a series of units or chambers of different types for performing dissimilar functions, a corresponding advantage lies not only in the ability to select the proper number of any type of units, but also in the ability to combine as adjacent units the units of different types, so that the column can be assembled of the exact number of chambers desired, with these chambers placed in any arrangement.

Another object of the present invention is to construct the units or sections of various types so that they may be cheaply manufactured, easily assembled and efficiently perform their several functions in the column or tower.

With the above objects in view, the present invention consists in the interchangeable unit distilling column and in the details of construction of the units thereof, hereinafter described and particularly pointed out in the claims.

The invention is illustrated in connection with a distilling column or tower, but it is to be understood that the present invention may be embodied in columns or towers used in processes other than distillation. Therefore, the term "distilling column or tower" as used in the specification and claims is intended to define a column or tower in which gas or vapor is treated in connection with the liquid in a manner similar to such treatment as occurs in any of the chambers of a distilling column.

In the drawings which illustrate the preferred embodiment of the present invention as applied to a distilling column or tower;

Figure 1 is a vertical sectional view of a distilling column embodying a number of units constructed according to the present invention;

Fig. 2 is a top plan view of an internal condensing section;

Fig. 3 is a vertical sectional view of an internal condensing section taken on the line 5—5 of Fig. 2;

Fig. 4 is a vertical sectional view of an internal condensing section taken on the line 6—6 of Fig. 2;

Fig. 5 is a top plan view of a vapor hood section;

Fig. 6 is a vertical sectional view of a vapor hood section taken on the line 8—8 of Fig. 5;

Fig. 7 is an elevation, taken partly in cross section of a loose deck section.

Referring to the drawings, the distilling column is formed of two separate parts or columns 1 and 2 placed one on top of the other. The mixture to be distilled is admitted into one of the middle sections of the upper part 2 by a trapped inlet pipe 3. The vapor from the part 2 is conducted through the pipe 4 to a condenser indicated at 5 and the unevaporated liquid is conducted from the bottom chamber of the part 2 through a trapped pipe 6 to one of the middle chambers of the lower part 1 of the column. This liquid is again put through a distilling process in the lower part 1, the vapor passing from the top chamber through the pipe 7 to a condenser indicated at 8 and the unevaporated or waste liquid passing out through a drain pipe 9 from the bottom chamber. The above arrangement of pipe connections is indicated merely to show a usual or possible construction for such column and forms no part of the present invention. The arrangement of the units in the column, although showing an operative distilling or rectifying column, is made primarily for the purpose of illustrating the various types of units rather than to illustrate an arrangement of units for any special conditions of distillation.

The distilling column as illustrated in Fig. 1 is built up of a pedestal 10, an injector steam heating section 11, four vapor hood sections 12, two internal condensing sections 13, each of said internal condensing sections being covered with a loose vapor hood deck 14, and a vapor outlet section 15. These units or sections make up the lowermost column or part 1. The upper column or part 2 consists of a tubular steam heating section 16, three vapor hood sections 17, a reducing section 18 which bears vapor hoods, two vapor hood sections 19, two internal condensing sections 20, each covered with a loose vapor hood deck 21, and a dome section 22. In the preferred form of the invention the units or sections of the columns are formed of castings of rectangular horizontal cross section. The castings are cheaply made and are particularly adapted for machine work in preparing them for assembly into the column. While the castings for the different tops of sections are, of course, different in shape, yet all the sections have, in common, certain features which relate particularly to the manner of assembling the sections into the column. Each section has outwardly turned flanges, the surfaces of which are accurately machined to fit similar flanges on the adjacent sections. Each section has nibs for retaining gaskets placed between it and the adjacent sections. Each section, except the loose deck sections, is provided with lugs for use in connecting the sections by means of bolts. These common features will be hereinafter more fully and specifically described. The rectangular shape of the sections possesses certain advantages which will be pointed out under the description of the various sections. The various sections or units will now be described in detail.

*Pedestal.*

The pedestal 10 is a hollow casting of rectangular pyramidal form. The pedestal has a flush deck or top 30 having a central boss 31 which is bored for the reception of the overflow drain pipe 9. The top of the pedestal has outwardly extending flanges 32, gasket retaining nibs 33 formed on two of the opposing sides, and bolt holding lugs 34. The flanges 32, nibs 33, and lugs 34 coöperate with similar flanges, nibs and lugs on the next section above. These flanges, nibs and lugs on the pedestal section are exactly the same in form and function as those on the top of the vapor hood section hereinafter described. The sides of the pedestal near its base are formed with steps or shoulders 35 which are bored to receive vertical anchor rods 36 which extend up from the foundation.

*Injector steam heating section.*

The liquid which enters the lower column or part 1 through the pipe 6 and which passes down through the vapor hood sections 12 is boiled in the heating section 11 to furnish the hot vapor which rises and furnishes the heat requisite for the multiple distilling or rectifying operations in the chambers above. The excess or unevaporated liquid overflows and is led away by the drain pipe 9. The injector steam heating section 11 is formed of a hollow casting having continuous side walls and open top and bottom. The top and bottom edges of the side walls are provided with outwardly extending flanges 45, gasket retaining nibs 46 and bolt holding lugs 47 which coöperate with similar flanges, nibs and lugs on the pedestal section 10 below and the vapor hood section 12 above to hold the sections assembled. These flanges, nibs and lugs are exactly the same as those on the vapor hood sections hereinafter described. The side walls of the section 11 together with the deck 30 of the pedestal section 10 form a liquid holding tank, the level of the liquid being fixed by the constant level overflow pipe 9. Since the joint between the pedestal section 10 and the heating section 11 is formed beneath the surface of the liquid contained in the heating section, a liquid seal is formed for such joint. This liquid sealed joint is less apt to leak than a joint which is exposed to the vapor, and in case of leak, the appearance of the liquid on the outside of the tower indicates the exact position of the leak. This joint is of course packed with a gasket of suitable packing material. The liquid in the tank-like chamber of this section is boiled by means of live steam. The steam is injected into the liquid through downwardly opening perforations 48 in a steam coil 49 which is supported within the section 11 and supplied with steam through a steam supply pipe 50 extending through one of the side walls of the section.

*Vapor hood sections.*

Above the heating section 11 are placed four vapor hood sections 12. The unevaporated liquid from the upper part or column 2 is discharged on the top of the uppermost of these four sections and trickles down through the overflow pipes into the heating section 11 where the least volatile part, or excess liquid, is drained off by the drain pipe 9 and the more volatile part is vaporized and rises through the vapor hoods of the lowermost vapor hood section, where it bubbles up through the stream of liquid which is flowing across the vapor hood section on its way to the bottom of the column. The hot vapor is in part condensed by the liquid, heat of condensation vaporizing the more volatile constituents of the liquid, which with the uncondensed vapor pass into the vapor hoods of the next higher vapor hood section, where partial condensation of the vapor and evaporation of the more volatile constituents of the downwardly flowing liquid again take place. This process of condensation and evaporation takes place in each section which is provided with vapor hoods and as there are a number of such sections, the most volatile constituents survive the repeated distilling or rectifying processes and pass out as vapor to be condensed in the condenser 8, while all of the less volatile constituents are discharged as liquid through the drain pipe 9. It is obvious that the degree of concentration and the amount of product condensed will for any particular mixture be determined by the rate of distillation and the selection of the proper number and type of the various sections, and hence the advantage of building a column by assembling interchangeable units which may be selected and assembled in a sufficient number to meet the conditions imposed in obtaining a certain distillate from a given mixture.

These vapor hood sections 12 are all alike and are illustrated more in detail in Figs. 5 and 6. Each section is formed of a casting having a general form of an inverted cup, the top deck 60 being cast integral with the side walls. This casting, like the castings for all of the other sections, has an oblong rectangular horizontal cross section. The sides which form the long and short sides of the oblong will, for convenience, be distinguished by reference numerals 61 and 62 respectively. Along the outside of the side walls 61 are formed two vertically extending ribs 63. One of the said ribs is broadened near its top to form a circular boss and the rib on the opposite wall is broadened near its bottom to form a similar circular boss. These bossed ribs are similar to the bossed rib 103 shown in Fig. 4 on the internal condensing section 13. These bosses may be bored for the reception of inlet or outlet pipes, of temperature or pressure indicating or regulating devices, or of sampling cocks. For the sake of illustration, both of the bosses are shown bored through in Fig. 6. It is obvious, however, that with the sections assembled, as shown in Fig. 1, these bosses will not be bored for inlet or outlet pipes but will be left blank or bored for the insertion of temperature or pressure indicators or of sampling devices. A number of bosses 65 and 66 are cast on the deck 60. The bosses 65 are bored to receive the riser pipes 67 which support the vapor hoods 68, and the bosses 66 are bored to receive the constant level overflow pipes 69. As illustrated, the bosses 65 are screwthreaded so that the riser pipes 67 may be screwed directly into them, while the holes in the bosses 66 are bored plain and the constant level overflow pipes 69 are secured therein by clamping collars 70. As will hereafter appear, it is necessary that the tops of these bosses be accurately planed off for the proper leveling of the vapor hoods and the overflow pipes.

The upper and lower edges of the side walls of this section are formed with continuous outwardly extending flanges 73 and 74 respectively. The upper flange 73 forms an outward continuation of the deck 60, although the greater part of the deck 60 is somewhat depressed below the upper surface of the flange. Upon the extreme outer edges of the flange 73 on the two sides above the short side walls 62, are formed upwardly projecting gasket retaining nibs 75. Upon the extreme outer edges of the flange 74 on the two sides below the long side walls 61, are formed similar but downwardly projecting gasket retaining nibs 76.

The manner in which the rough castings are machined to plane off the bosses 65 and 66 and the upper and lower surfaces of the flanges 73 and 74 respectively, will now be described. To machine the lower face of the section, the section casting is inverted and placed in a planer or milling machine and the lower face machined across in the direction parallel to the longer side walls 61. The entire face of the flange 74 is thus planed off except the nibs 76 which are left projecting downwardly at the outer edge of the flange. By forming the nibs 76 upon opposite sides of the casting, the entire bottom face of the casting between these nibs may be leveled straight across by machine planing or milling in one direction. Such machine work is both cheaper and more accurate than hand work. To finish the upper face of the casting, it is placed in a planer or milling machine and machined across in a direction parallel to the shorter side walls 62 in a manner exactly similar to the planing or milling of the bottom surface. By this machining operation, the upper face of the flange 73 is accurately planed off and the tops of the bosses 65 and 66 which project up from the deck 60 are also planed to the exact level of the top of the flange 73. The greater part of the deck 60, as before mentioned, is somewhat depressed below the top of the flange 73 and the bosses 65 and 66. This is for economy in the planing operation, since it is not necessary to plane the entire deck but only the top surface of the flange and the bosses. The machining of the upper surface in the direction of the short side walls 62 leaves the upwardly extending gasket retaining nibs 75 projecting upwardly beyond the top of the flange 73 along the short side of the section. The nibs 75 are upon different sides than the nibs 76 so that when two sections are assembled the gasket which is placed between the planed surfaces of the flanges on adjacent sections are held in place by the upwardly extending nibs 75 on the short sides of the sections and the downwardly extending nibs 76 on the long sides of the sections. Since the pressure within the distilling tower is frequently above that of the atmosphere, these gasket retaining nibs perform a very important function in preventing the gaskets from being blown out.

The nibs 75 and 76 are sufficiently long so that they fit over the outside edges of the flanges on the adjacent sections. The sections therefore cannot be fitted together until one section is placed exactly over the other section, so that the flanges fit inside of the nibs. This assures an exact matching or alinement of the sections in assembling the column or tower. Moreover, if the sections be of a square cross section, the presence of the nibs will prevent any accidental placing of one section on top of the other at right angles from what its position should be. By constructing the sections as above described, each section is prepared for fitting with the sections immediately above and below it by only two machining operations, these machining operations consisting of planing or milling the upper and lower faces of the sections across in directions at right angles to each other. As shown in Fig. 1, all of the sections are provided with the outwardly extending flanges the same as the flanges 73 and 74 of the vapor hood sections. All of these sections are prepared for assembling in the tower by having the upper and lower faces machined in the same manner as the above described vapor hood section. The heating sections 11 and 16 and the internal condenser sections 13 and 20 have no top decks so that the machining operation across their upper faces is that of planing off the upper surfaces of the flanges only. The above described method of fitting the sections together is common to all of the sections. It is obvious that only the top of the pedestal 10 and the bottom of the dome section 22 are planed, while both the top and the bottom of each of the intermediate sections are planed.

While the rectangular shape of the sections is best adapted for the above described operations of planing straight across the upper and lower surfaces in directions respectively parallel to two adjacent sides of the rectangle of cross section, it is obvious that sections of different shaped horizontal cross section can be planed in a similar manner. A section having any parallelogrammic horizontal cross section can be planed straight across the top in directions respectively parallel to two adjacent sides of the parallelogram of cross section and a plurality of nibs be left upon two opposite sides of both its upper and lower planed surfaces. Sections having a circular and elliptical horizontal cross section can be planed straight across the top and bottom in directions at right angles to each other, in which case but a single nib will be left upon each of the two opposite sides of the planed upper and lower surfaces at either side of the planed area.

In considering the limitations imposed by the form of the sections or units, it will be seen that with a unit of parallelogrammic horizontal cross section, it is possible by straight machine planing or milling to leave a plurality of nibs upon the two opposite sides of both its upper and lower surfaces, and that with a unit of non-parallelogrammic cross section, it is possible by straight planing or milling to leave but a single nib upon the two opposite sides of its upper and lower surfaces respectively. The employment of sections of parallelogrammic and more particularly of rectangular horizontal cross section is therefore most advantageous, as it gives a greater number of gasket retaining and alining nibs, but the employment in a column of units of other cross section having their upper and lower faces planed in the manner above indicated, is within the purview of the invention.

On the sides of each vapor hood section 12 are cast bolt retaining lugs, indicated by reference numerals 80 and 81, the two sets of lugs 80 and 81 acting to receive the bolts which clamp this section to the sections immediately above and below respectively. The lugs 80 are bifurcated and have the ends of their bifurcated extremities provided with downardly extending nibs 82 to retain the bolt heads or nuts from slipping from the ends of the lugs. The bifurcated lugs 81 are provided with similar upwardly extending nibs 83. The manner in which the sections are clamped together by bolts is clearly illustrated in Fig. 1. The use of the bolt holding lugs 80 and 81 possesses distinctive advantage over the usual method of assembling similar members by bolts passed through holes bored through outwardly extending flanges. The presence of such holes in the flanges weakens the flanges and also necessitates similar holes being made through the packing gaskets, whereas in the present construction the surfaces of the flanges 73 and 74 are continuous and an unbroken packing gasket may be placed between them. As shown in Fig. 1, all of the sections except the loose deck sections 14 and 21 are provided with bolt holding lugs the same as the above described lugs on the vapor hood sections. While in the preferred embodiment illustrated, each individual section which has side walls is provided with bolt receiving lugs, it is not necessary to place lugs on each and every section. In some columns, particularly in short columns, the columns may be held together by vertical tie rods extending the length of the column and secured to only the top and bottom sections, or the column may be held assembled by means of a number of sets of vertical tie rods secured to only certain of the sections and extending over the intervening sections.

As shown in Fig. 1, the hollow chamber below the deck 60 of one vapor hood section forms, with the deck of the section immediately beneath it, a liquid retaining chamber, into which project the vapor hoods on the deck of the section beneath. The packed flange joint between the sections is at the bottom of this chamber so that the liquid in the chamber forms a liquid seal over the joint. This liquid sealed joint is much tighter than a joint which is exposed to vapor, and in case a leak occurs its presence will be immediately detected by the presence of liquid oozing to the outside of the tower. All of the connecting joints between the sections are made to have a similar liquid seal wherever practicable in constructing the tower.

The liquid level in the chambers containing the vapor hoods is determined by the two overflow pipes 69. These overflow pipes 69 rise far enough above the top of the deck 60 so that the liquid will submerge the lower part of the vapor hoods 68. The vapor formed by the boiling of the liquid in the heating sections passes up through the riser pipes 67 and out beneath the lower edges of the hoods 68 and bubbles up through the liquid. The lower ends of the overflow pipes 69 extend nearly to the bottom of the chamber immediately beneath them, so that the liquid in this chamber acts to seal the lower ends of the overflow pipes 69 and to prevent any vapor passing up through them. As shown in Fig. 1, the overflow pipe 85 which drains the lowest vapor hood chamber is longer than the rest and is extended to nearly the bottom of the steam injector heating section 11.

The construction of the vapor hoods 68 is best illustrated in Fig. 6. Each vapor hood comprises a riser pipe 67 and a cap or hood 68. The riser pipe 67 is open at its lower end and is screwthreaded into the deck 60. Lugs 95 on the sides of the riser pipes above the screwthreaded lower ends bear on the planed upper surfaces of the bosses and limit the distance that the riser pipes are screwed into the deck. Openings 87 are provided at the top of the riser pipe 67 for the discharge of vapor within the upper part of the hood 68. A bolt 88 passing through the top of the hood 68 is received in a screwthreaded hole in the top of the riser pipe 67. The hood 68 is closed at the top and has its lower edge flanged out. In this flanged lower edge of the hood are sawed a number of notches 89 which act to discharge the vapor in small bubbles equally around the circumference of the hood. The hood 68 is provided with three inwardly and downwardly extending wings 90. These wings 90 fit over the riser pipe 67 and act to space the hood equally from it on all sides. The lower ends of the wings 90 rest on the planed top of the boss 65. When the bolt 88 is tightened, it forces down the cap 68 and presses the lower ends of the wings 90 against the planed top of the boss 65. The ends of the wings 90 are accurately leveled, in a plane parallel to the plane through the lower edge of the hood 68, and since they fit against the planed upper surface of the boss, the cap 68 is accurately leveled so that the vapor is discharged equally from all sides of the lower edge thereof. The importance of the accurate planing which it is possible to perform by machine work is obvious, particularly in view of the fact that the vapor is discharged through a number of vapor hoods 68 and the liquid overflows through a number of overflow pipes 69. For the proper operation of these vapor hood sections, the vapor should be discharged equally through each of the vapor hoods 68 and equal amounts of liquid should overflow through each of the overflow pipes 69.

The distances which the lower ends of the wings 90 of the several vapor hoods extend below the lower edges of the hoods 68 are all equal, and the distances between the open tops of the several overflow pipes 69 and the shoulders 92 are all equal, and therefore since all of the bosses 65 and 66 are accurately planed in the same operation, all of the vapor hoods and all of the overflow pipes will have their respective openings at exactly the same respective distances above the surface of the horizontal deck 60 so that equal amounts of vapor or of liquid will pass through each individual hood 68 or pipe 69.

By comparing Figs. 1 and 5, it will be seen that the liquid from the section above is discharged by the two overflow pipes 69 at one side of the vapor hood deck, and flows across the deck around the vapor hoods 68 and out through the two overflow pipes 69 on the opposite side of the chamber. As shown in Fig. 5, the vapor hoods 68 are arranged in staggered formation so that the liquid is divided and flows equally around each hood. The rectangular shape of the chambers permits the arrangement of the vapor hoods and overflow pipes to cause a much more even flow across the chamber than would be possible with a chamber of circular cross section. While, as shown in the drawings, there are seven vapor hoods and two overflow pipes mounted on each deck, it is obvious that if sections larger or smaller in cross sections are desired, the same relative arrangement can be had with a different number of hoods and overflow pipes. The even distribution of the flow of the liquid around the vapor hoods assures an even heating and consequent re-evaporation throughout the liquid caused by the hot vapor which issues from the hoods and bubbles up through the liquid.

*Internal condensing sections.*

It is found that in distilling columns built up uniformly of vapor hood sections, the upper sections which effect the final concentration of the distillate act to produce lesser degrees of concentration than the lower sections, so that many more chambers are required to effect the final concentration at the top than to do the bulk of the work at the bottom. Moreover, the amount of heat dissipated from the upper sections is usually insufficient to cause enough condensation to furnish a sufficient amount of liquid to keep the vapor hoods submerged, and there is a tendency for the chambers to become dry, so that it is the usual practice to pass the vapor from the top of the column through a reflux condenser, from which a part of the condensed liquid is returned to the topmost chamber of the column. With the object, therefore, of increasing the effectiveness of the upper chambers in concentrating the distillate, and of supplying sufficient liquid to keep the vapor hoods submerged, two internal condensing sections 13 are placed above the vapor hood sections 12. On each of the internal condensing sections 13 is mounted a loose deck 14 which carries vapor hoods which act like the vapor hoods on the sections 12 to cause the rising vapor to bubble through the liquid held on the deck. These condensing sections increase the degree of concentration effected by the rectifying or distilling operations carried on in the chambers immediately below the condensing coils by reducing the temperature of the vapor and returning as liquid to the chambers below the volatile constituents condensed by the condensing coils. The amount of condensation to which the vapor is subjected in these reflux condensing sections can be accurately regulated by the amount and temperature of the cooling medium supplied to the condenser pipes.

The internal condensing sections 13 are illustrated in detail in Figs. 2, 3 and 4.

The internal condensing sections are formed of hollow castings having two horizontal staggered decks 100 and 101 extending nearly across the interior of the casting chamber about one-third of the way from the top and the bottom respectively. The longer opposite side walls 102 of the casting are continuous, and have on their outer faces vertically extending ribs 103 which are expanded into circular bosses 104 and 105. These bosses, like the bosses on the vapor hood sections, may be bored, as shown in Fig. 3, for the reception of inlet or outlet pipes, or temperature or sampling devices. As shown in Fig. 3, the hole through the boss 104 is above the liquid level on the top of the deck of the upper vapor hood section, and the hole through the boss 105 is below the liquid level. As illustrated in Fig. 1, the liquid carrying pipe 6 enters through one of the bosses 105 to discharge liquid into this chamber. The shorter side walls 106 of the casting which forms this section have openings therein between the decks 100 and 101. The edges of these openings are machined and the openings are closed in the completed section by plates 107 which carry the condenser tubes 108. Suitable packing material 109 is placed between the casting and the plates 107 to make a tight joint. The tubes 108 are arranged in three horizontal rows of seven tubes each. The ends of the tubes extend through the plates 107 and are packed vapor tight by suitable packing material 110 compressed by glands 111. The bores of the glands 111 are somewhat restricted near their outer ends to form internal annular shoulders 112 which fit against the ends of the condenser tubes and prevent them from shifting their position longitudinally. The open ends of the tubes 108 are covered by manifold plates 115. The manifold plates 115 are clamped to the section casting by means of clamping bolts 116 and a tight joint is secured between the plates 107 and 115 by suitable packing 117. The plates 107 and 115 resist all of the pressure longitudinally of the condenser pipes, and as these plates are bolted to the casting the condenser pipes 108 are subjected to no longitudinal strain but merely to radial pressures. The condenser water or other cooling medium is led in through an inlet 120 in one manifold plate and discharged through an outlet 121 in the opposite manifold plate. The inner faces of the manifold plates 115 are provided with recesses 122. The arrangement of these recesses is indicated by dotted lines in Figs. 2 and 3, and is such that the water which enters the inlet 120 is divided into three streams and flows across the three horizontal rows of condenser tubes in equal amounts. The water thus flows through the three rows in multiple but goes through the individual pipes of each row in series. Since the inlet 120 and outlet 121 are at the lower and upper parts of the opposite plates 115 respectively, and the three horizontal rows are connected in multiple, any air will be forced through the upper row of tubes and no air lock can be formed in the condenser pipes. The flow of water, as shown in Fig. 3, is from right to left, while the flow of the vapor is around the open end of the deck 101 and across through the condenser pipes from left to right in a counter current direction to that of the water. This counter current arrangement assures that the vapor is brought into contact with successively colder pipes, and the best conditions for condensation attained. The lower side of the upper deck 100 is provided with ribs 123 extending in the same direction as the condenser pipes to counteract the tendency which the vapor has to creep along the lower surface of this deck, and, by interrupting its flow, direct the vapor downwardly against the condenser pipes.

The chamber formed in the open lower third of the internal condensing section beneath the deck 101 is for the reception of the vapor hoods 68 which are mounted on the deck of the vapor hood section 12 immediately beneath the first internal condensing section 13. The similar chamber in the second internal condensing section is occupied by the vapor hoods on the loose deck section 14 placed between the two internal condensing sections.

An upwardly extending flange 120' is cast on the top of the horizontal deck 100 and forms a trough for retaining liquid to make a liquid seal over the lower end of the overflow pipe 121' which extends down from the loose deck section 14, as illustrated in Fig. 1.

Each internal condensing section has outwardly extending upper and lower flanges 125 and 126, upwardly and downwardly extending gasket retaining nibs 127 and 128, and upper and lower bifurcated bolt holding lugs 129 and 130. These are formed and machined in exactly the same manner as the flanges, nibs and lugs on the vapor hood sections.

The rectangular cross section of the casting is the most advantageous for forming the internal condensing section, because flat tube holding and manifold plates can be secured to the sides of the casting and because the straight condenser tubes can be arranged in the most compact formation within the rectangular chamber of the casting.

*Loose deck section.*

On top of each internal condensing section is placed a loose deck section 14 which is illustrated in detail in Fig. 7. This loose deck section is provided with overflow pipes 121 and vapor hoods 135 exactly similar to the deck 60 of the vapor hood sections. The main part of the loose deck section 14 is of about the same thickness as the deck 60, and like the deck 60 has bosses which are bored for holding the vapor hoods and outlet pipes. The outer edge of the loose deck section 14 is of about the same thickness, as indicated at 136 in Fig. 7, as the bosses, and corresponds to the flanges 73 and 74 of the vapor hood sections. The thickened edge 136 and the bosses are accurately planed or milled in exactly the same manner as the upper and lower surfaces of the vapor hood sections, so that upwardly and downwardly extending gasket retaining nibs 137 and 138 are left like the nibs 75 and 76 on the vapor hood sections. As shown in Fig. 1, loose deck sections are placed on the top of the internal condensing sections and are clamped in place by the bolts which are held by the bolt retaining lugs on the sections immediately above and below the loose decks. Suitable packing material is of course placed between the planed off edges 130 and the flanges of the adjacent sections, forming a tightly packed joint. While in the condensing tower illustrated all of the loose deck sections are shown bored through for reception of vapor hoods and overflow pipes, loose decks of exactly the same sort, but which are not bored may be employed for forming tight partitions in the column, or for other purposes.

Vapor outlet section.

Above the internal condensing sections 13 is placed a vapor outlet section 15. This vapor outlet section has continuous side walls and a tight deck 140 cast integral with the side walls. In the lower part of the chamber within this section are the vapor hoods 135 of the next lower section. Above the vapor hoods, a vapor space is left in which the vapor is collected and is discharged through the vapor outlet pipe 7 which enters through a boss formed in the side wall of the section. The boss through which the outlet pipe 7 enters is formed by an enlargement of an external bossed rib similar to the bossed rib 103 as shown in Fig. 4. This section forms the top of vapor discharge section of the lower part of the column 1.

The vapor hood sections 17 and 19 and the internal condensing sections 20 and the loose decks 21 of the upper part 2 of the column are exactly similar to the corresponding sections in the lower part 1 of the column. The tubular steam heating section 16, the reducing section 18 and the dome section 21 are different and will be now described in detail.

Tubular steam heating section.

The tubular steam heating section forms the lower section of the upper part or column 2. This section is formed of a casting having a tight deck 160 across its interior about one-fourth of the distance from the bottom, and two reinforcing ribs or bars 161 extending across the chamber formed above the deck 160. All of the side walls of the casting below the deck 160 are continuous, so that when the section is assembled, as shown in Fig. 1, a heat insulating space 162 is left between the decks 140 and 160. A series of steam heating tubes 172 are connected between opposite sides of the chamber similar to the mounting of tubes 108.

The ribs or bars 161 of the casting, together with the deck 160, reinforce the casting to resist the outward pressure of the steam. The height of the liquid in the chamber above the deck 160 is fixed by the overflow opening into the pipe 6 so that the heating tubes 172 are always submerged. The vapor driven off by the heat rises through the vapor hoods of the vapor hood section 17 immediately above the undergo rectifying process in the upper part of the column. Long overflow pipes 188 extending nearly to the deck 160 form liquid sealed drain pipes for the vapor hood section immediately above the heating section.

The heating section has outwardly extending planed flanges, gasket retaining nibs and bolt holding lugs formed in exactly the same manner as described under the vapor hood section.

The rectangular shape of the casting renders it particularly adaptable for forming the tubular steam heating section, because flat manifold plates can be bolted to the flat sides of the casting and because straight heating pipes can be packed in the most compact manner in the section.

While, ordinarily, a tubular steam heating section and a steam injector section would not be used in the same compound column because in distilling a given mixture one of said heating sections is more efficient than the other, yet for the sake of illustrating both types of heating sections, the two types are incorporated into the same compound column and are shown as operating successively on the same mixture to be distilled.

Reducing section.

In many distilling columns the volume of vapor or liquid which circulates through the In many distilling columns the volume of which circulates through the lower chambers. It is therefore possible to employ chambers of smaller cross section at the top of the column. In a column built up of interchangeable units, the smaller units at the top are similar but of smaller size than the units at the bottom. To form a connecting unit between the larger units at the bottom and the smaller units at the top, a reducing section is employed, as indicated by reference numeral 18 in Fig. 1. This reducing section is shown as a vapor hood section and differs from the other vapor hood sections only in that the side walls slope inwardly so that while its lower face fits on a larger section beneath, its upper face is adapted to fit with a smaller section placed above it. The outwardly extending flanges, the gasket retaining nibs and bolt holding lugs on this section are formed exactly the same as on the other vapor hood sections. The side walls of the section are formed with bosses like the side walls of the other vapor hood sections for the reception of pipes or indicating or sampling devices.

*Dome section.*

The column is surmounted by a dome section 22. The lower part of the dome section has outwardly extending flanges, gasket retaining nibs and bolt holding lugs like all the other sections and is bolted on to the top of the upper internal condensing section 20, a loose deck section 21 being placed between the dome section and the condensing section. The dome section forms a closed chamber into which the vapor hoods of the loose deck section project and in the upper part of which the vapor is collected and discharged through the outlet pipe 4 which is screwed into a central boss 195 on the top of the dome.

While the various sections have been described as being formed of castings, the present invention is not limited in its scope to cast units, as it is evident that a column formed of units made of other materials, such as sheet metal, earthenware, etc., may be constructed embodying many of the features of the present invention. Neither is the present invention limited to sections having a rectangular cross section, since sections of various other cross sections might be employed within the spirit of the invention.

While the plane surfaces formed on the upper and lower faces of the units or sections have been described as being formed by a planing or milling operation, it is within the purview of the present invention to employ units or sections having upper and lower plane surfaces formed in any manner; for example, the upper and lower plane surfaces may be cast approximately smooth and a gasket of comparatively thick packing material be employed to take up the inequalities or roughness on the comparatively smooth but unplaned matching upper and lower faces. While sections constructed as hereinbefore described constitute the preferred form or embodiment of the present invention, it is to be understood that the invention is not limited to these exact details of form or construction, but may be otherwise embodied within the spirit of the invention and the scope of the following claims:

I claim:

1. A unit or section for a column or tower of the character described having its upper face planed straight across to leave an upwardly projecting nib on either side of the planed area and having its lower face planed straight across at an angle to the direction of the line of planing of the upper face to leave a downwardly projecting nib on either side of the planed area, whereby when a similarly formed section is placed on the top thereof the two sections are prevented from sliding on one another in any direction.

2. A unit or section for a column or tower of the character described having its upper face planed straight across to leave an upwardly projecting nib on either side of the planed area and having its lower face planed straight across in a direction at right angles to the direction of the plane of the upper face to leave a downwardly projecting nib at either side of the planed area, whereby when a similarly formed section is placed on the top thereof the two sections are prevented from sliding on one another in any direction.

3. A column or unit of the character described having, in combination, a plurality of chambered units of parallelogrammic horizontal cross section placed one above the other to form a series of communicating chambers, each unit having upwardly projecting nibs at the outer edges of two of its opposite sides and having its upper face between said nibs planed straight across in a direction parallel to the sides upon which the nibs are located to form a smooth packing surface, and having downwardly projecting nibs at the outer edges of two of the opposite sides of its lower face and having its lower face between said nibs planed straight across in a direction parallel to the sides upon which the nibs are located to form a smooth packing surface, the sides upon which the downwardly projecting nibs are located being sides adjacent in the parallelogram of cross section to the sides upon which the upwardly projecting nibs are located, packing material placed between the units, said nibs acting both to aline the sections and to retain the packing in place, and bolt holding lugs formed on the units projecting outwardly beyond the outer edges of the flanges for receiving bolts for bolting together adjacent units of the column.

4. A unit or section of parallelogrammic cross section for a column or tower of the character described having its upper and lower faces planed straight across in directions parallel respectively to two of the adjacent sides of the parallelogram of cross section to leave upwardly and downwardly projecting nibs on each of the two opposite sides of the upper and lower faces respectively which lie at the sides of the planed area.

5. A column or tower of the character described having, in combination, a plurality of chambered units or sections placed one above the other to form a series of communicating chambers, each unit having an upwardly projecting nib on each of two opposite sides of its upper face and having its upper face between said nibs planed straight across to form a smooth packing surface, and having a downwardly projecting nib on each of two opposite sides of the lower face and having its lower face between said nibs planed straight across to form a smooth packing surface, packing material placed between the several units and retained in place by the nibs, and means for holding the units assembled in the column.

6. A column or tower of the character described, having, in combination, a plurality of chambered units of parallelogrammic horizontal cross section placed one above the other to form a series of communicating chambers, each unit having upwardly projecting nibs on each of two opposite sides of its upper face and having its upper face between said nibs planed straight across in a direction parallel to the sides upon which the upwardly projecting nibs are located, to form a smooth packing surface, and having a downwardly projecting nib on each of two opposite sides of its lower face and having its lower face between said nibs planed straight across in a direction parallel to the sides upon which the downwardly projecting nibs are located, to form a smooth packing surface, the sides upon which the downwardly projecting nibs are located being sides adjacent in the parallelogram of cross section to the sides upon which the upwardly projecting nibs are located, packing material placed between the units and retained in place by the nibs, and means for holding the units assembled in the column.

7. A unit or section for a column for distilling liquids having side walls and a depressed top deck formed integral with the side walls, said depressed deck being provided with a series of bosses for the mounting of vapor hoods, the bosses and side walls being planed straight across.

WALTER E. LUMMUS.

Witnesses:
CHAS. BOARDMAN,
GEORGE E. STEBBINS.

It is hereby certified that in Letters Patent No. 1,226,898, granted May 22, 1917, upon the application of Walter E. Lummus, of Lynn, Massachusetts, for an improvement in "Columns for Distillation and the Like," errors appear in the printed specification requiring correction as follows: Page 8, line 82, for the word "the" read *to;* same page, strike out line 115 and insert the words *upper chambers is less than the volume;* and that the said Letters Patent should be read with these corrections therein that the same may conform to the record of the case in the Patent Office.

Signed and sealed this 26th day of June, A. D., 1917.

[SEAL.]

R. F. WHITEHEAD,
*Acting Commissioner of Patents.*

Cl. 195—13.